United States Patent [19]

Graef

[11] Patent Number: 4,491,023

[45] Date of Patent: Jan. 1, 1985

[54] MEANS FOR CHECKING AND/OR MEASURING THE ACTUAL AMOUNT OF SPRAYED PLANT PROTECTIVE SUBSTANCES

[76] Inventor: Steffen Graef, Roter Brachweg 26, Regensburg, Fed. Rep. of Germany

[21] Appl. No.: 315,872

[22] Filed: Oct. 28, 1981

[30] Foreign Application Priority Data

Nov. 6, 1980 [DE] Fed. Rep. of Germany ....... 3041916

[51] Int. Cl.³ .......................... G01F 1/00; G01F 9/00
[52] U.S. Cl. ...................................... 73/861; 73/168; 73/427; 73/432 R
[58] Field of Search ................ 73/223, 3, 168, 861, 73/426, 427, 432 V

[56] References Cited

U.S. PATENT DOCUMENTS

| 2,058,118 | 10/1936 | White | 141/392 |
| 2,165,705 | 7/1939 | Houser | 73/215 |
| 2,281,512 | 4/1942 | Reed | 73/215 |
| 2,726,549 | 12/1955 | Geffer | 73/427 |
| 2,767,581 | 10/1956 | Moorehead | 73/215 |
| 3,001,397 | 9/1961 | Leonard | 73/219 X |
| 3,129,844 | 4/1964 | Madison | 73/427 X |
| 4,079,629 | 3/1978 | Hope . | |
| 4,357,670 | 11/1982 | McFarlane | 73/861 X |

FOREIGN PATENT DOCUMENTS

| 1607391 | 4/1971 | Fed. Rep. of Germany . |
| 2555011 | 6/1977 | Fed. Rep. of Germany . |
| 1111752 | 2/1955 | France . |

OTHER PUBLICATIONS

Agrarteknik International p. 32, Feb. 1980.

*Primary Examiner*—James L. Rowland
*Assistant Examiner*—Brian R. Tumm
*Attorney, Agent, or Firm*—Sandler & Greenblum

[57] ABSTRACT

A device and a method for checking and/or measuring the actual discharge amount of plant protective substances sprayed from a plant protective spraying machine; the device is a measuring container provided with a scale indicating the volume of liquid and with additional markings for determining the corresponding discharge amounts in liters per hectares for various driving speeds. Alternatively, the device is a spring balance with markings in connection with a measuring container holding the liquid to be measured, which markings determine the discharge values in liters per hectares for various driving speeds.

11 Claims, 2 Drawing Figures

MEANS FOR CHECKING AND/OR MEASURING THE ACTUAL AMOUNT OF SPRAYED PLANT PROTECTIVE SUBSTANCES

BACKGROUND OF THE INVENTION

1. Field of the Invention

This invention refers to the field of plant protection, and especially to the determining of the actual amount of plant protective substances sprayed by spraying machines.

2. Description of the Prior Art

DE-AS No. 16 07 391, DE-OS No. 25 55 011, *Periodical Agrartechnik International,* February 80, page 32.

For discharging plant protective substances in agriculture plant protective spraying machines are used. For the spraying which is carried out over wide areas from vehicles on the ground, so-called area spraying lever systems are used which are provided with pipes arranged transversely to the direction in which the vehicle moves, which are different widths (about 6–24 m), and on which a plurality of nozzles are mounted for discharging the protective substances. These nozzles usually are arranged at a distance of 50 cm from each other. Because the plant protective substances, which are usually diluted in an aqueous solution, are to be sprayed in a very precise manner, plant protective spraying systems generally have metering devices which operate in a more or less exact manner and are operated manually, semi-automatically or fully-automatically. The metering data provided by the manufacturers of plant protective substances generally refer to liter per hectares (one hectare = 10.000 square meters). The parameters for the amount of sprayed liquid are the speed of movement, the operating width and the amount of discharge. In view of the costs, most of the plant protective spraying machines used in practice are not provided with a metering device for measuring the speed of movement separately. The speed of movement is generally read from the speedometer of the tractor or alternatively is determined by trial and error. With equal nozzle distance of f.i. 50 cm it is not necessary to consider the entire operating width of the area spraying lever system because each nozzle sprays an identical area at an equal speed of movement. Therefore, it is sufficient to start from the discharge amount of an individual nozzle if all other nozzles are of the same type, are substantially identical, have the same degree of wear, and operate under equal pressure conditions. Most of the plant protective spraying machines used in practice are not provided with measuring means for metering the amount of liquid actually discharged by the nozzles. Therefore, in general only the discharge "pressure" is measured. By means of a discharge amount table, which is classified according to nozzle types (nozzles sizes) from the pressure, the actual discharge or the actually discharged amount in liter per hectares can be read from the pressure depending on the speed of movement. Semi-automatically operating plant protective spraying machines, and a number of the standard plant protective spraying machines, are provided with so-called adjustment aids, according to which the discharge amount table is arranged directly at or around the manometer so that from the indication on the manometer, depending on the type of nozzle used and the chosen speed of movement, the actual discharge amount can be read in liters per hectares.

However, the exactness of this measuring method depends to a considerable extent on whether the used nozzle type (nozzle size) actually rallies with the supplied table, on the actual condition (wear) of the nozzles, on the exactness of indication of the manometer, on the density and viscosity of the discharged liquid, and on any pressure losses between the measuring point of the manometer and the corresponding nozzles. Additional deviations can result from nozzle series elements, which are manually used, f.i. nozzle filters, ball valve filters, ball valves etc.

For these reasons it is necessary for the farmer to be in a position to individually check the actual discharge amount of his plant protective spraying machine before starting any spraying operation, and this is done in practice according to one of the following two methods:

Method 1.: The container of the plant protective spraying machine is filled with water to a predetermined level. Then operation of the machine is started and the machine is moved over a predetermined surface area. Subsequent thereto, the discharged amount of liquid is measured within the container (the difference in volume), and this amount is divided by the area of the surface over which the machine has been moved, and the value obtained is calculated for liters per hectares. This method has the following main error sources: Usually, the amount of liquid lacking in the container is read from the container scale, so that considerable errors occur as a result of the inexactness of the container scale, varying inclination of the container, too rough divisions of the scale, and reading errors.

Method 2.: A measuring beaker is placed underneath a nozzle for a predetermined time with a pre-set operating pressure; the discharge amount and the measuring time are predetermined; the value is calculated for liters per minute or liters per hour; and then, by means of a table or a slide rule the actually discharged amount in liters per hectares is determined for a predetermined speed of movement. The disadvantage of this method is that it is rather complicated for the farmer to carry out this method in practice.

Both methods usually require a thorough knowledge of the physical and calculating procedures as well as of the possible error sources. The ordinary farmer usually does not possess this knowledge. Futhermore, the checking methods are rather complicated and time consuming. This has led to the fact that the farmer merely checks the actual discharge values of his spraying machine—if at all—once a year before the spraying season starts, and subsequent thereto does not make any alterations in the adjustment of the spraying machine so that he sprays all the widely different substances with the same amount of liquid. Of course, the result is, that on the other hand the effect of the spraying material is considerably decreased, and that on the other hand the farmer, when mixing the various fluid concentrations, makes mistakes; or that mistakes are caused because he relies on the steady discharge amount of his spraying machine. It is not necessary to deal in detail with the ecological problems of over-and under-concentrations of plant protective substances.

OBJECT OF THE INVENTION

Therefore, it is an object of this invention to provide a checking and/or measuring device by means of which the farmer is in a position without any specialized knowledge of the actual technical and mathematical relations involved, to supervise or to measure the actual discharge amount of his plant protection spraying machine in a very simple manner. and—if necessary—to alter the pressure adjustment to the correct value.

SUMMARY OF THE INVENTION

According to one embodiment of the invention this is achieved in that the means for checking and/or measuring the actual amount of sprayed plant protective substances is a measuring containter, especially a measuring beaker, which holds a certain amount of plant protective liquid discharged from one nozzle of the spraying machine within a predetermined time period, and which is provided with a volume scale and additional markings, which, for various speeds of movement, determine the corresponding discharge amount values in liters per hectares.

According to another embodiment of this invention the above object is achieved in that the checking and/or measuring device comprises a spring scale with markings which, for various speeds of movement, determine the corresponding discharge values in liters per hectares, and a measuring container, which holds the amounts of plant protective liquid discharged within a predetermined time period.

The measuring container, preferably a measuring beaker or cylinder, is provided with a millimeter scale of sufficient exactness. In addition to this millimeter scale the measuring cylinder has a number of scales for the various speeds of movement the individual sections of which mark discharge values in liters per hectares. These scales are calculated for a predetermined measuring time. With the spraying apparatus in operation the farmer merely has to hold the measuring cylinder underneath one of the nozzles for the time period of the predetermined measuring time (f.i. 15 seconds), and subsequent thereto he is able to read directly on the measuring cylinder (from the filling height) the discharge amount in liters per hectares, which has been obtained with the corresponding speed of movement. If the actual discharge amount is not in agreement with the required amount, the operation can be repeated with altered pressure adjustment without any problem as often as required until the required value has been met. Therefore, it is no longer necessary to try to find out the discharge amount from complicated, and rather often non-available, discharge amount tables with pressure adjustment statements concerning the nozzles. The measuring operation according to this invention is thus independent of nozzle types and pressure adjustments.

Instead of a calibrated measuring cylinder a measuring container can be used which has been calibrated later on; the exactness with which it is possible to read various volumes within the measuring container determines the exactness of the check or measurement so that usually non-calibrated measuring containers cause inexact results. Instead of the scale made up of measuring data, diagrams can be provided on the measuring container so that the farmer is in a position to derive intermediate values in a simple manner.

Furthermore, the measuring cylinder can be provided with an elastic collar so that even very fine droplets of the sprayed liquid will be collected within the cylinder, and so that it is guaranteed that even small amounts of sprayed liquid will not be lost when collected.

BRIEF DESCRIPTION OF THE DRAWINGS

The following is a description of two preferred embodiments according to the invention to be read in conjunction with the accompanying drawing.

DETAILED DESCRIPTION OF THE PREFERRED EMBODIMENTS

Figure 2:
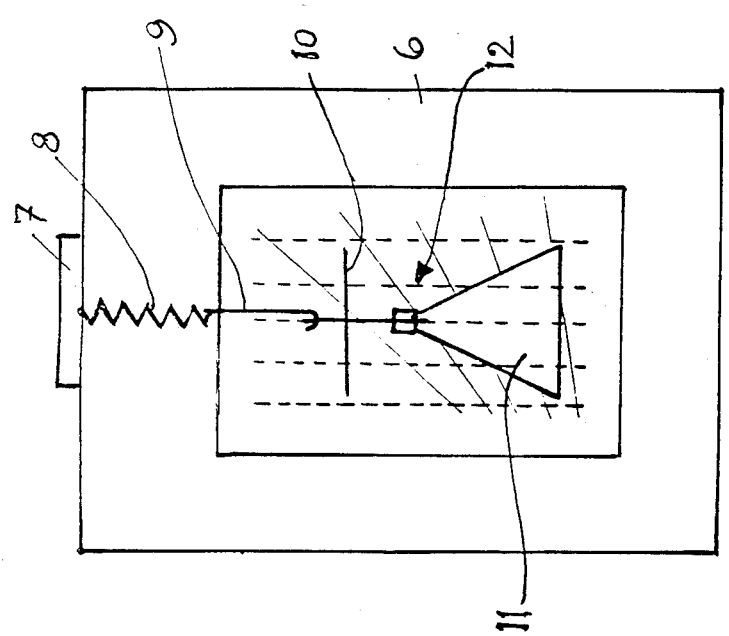
FIG. 2 is a schematic view of a spring scale with a measuring bag.

A measuring cylinder 1, preferably made of transparent plastic material comprising a cylindrical shell or wall 2 and an enlarged base 3 is provided with markings 5 on its shell. The markings 5 are either painted, fixed by adhesive or the like on the inner or the outer side of wall 2, or are engraved into the material of wall 2 or are provided according to any other procedure known in the field of making measuring cylinders. With the shown embodiment the measuring cylinder is provided at the top with a flexible collar 4 or the like. The markings on the shell 2 refer to the measuring time, f.e. 15 seconds in the special embodiment, and to the statements liters per hectares for various driving speeds of 3, 4, 5 and 6 km/hour. The groups of markings pertaining to a predetermined speed are arranged in a vertical line each. With a predetermined filling height of the cylindrical container 1, which will be reached within the filling time of 15 seconds, considering a predetermined, adjusted driving speed, the corresponding discharge amount can be read directly in liters per hectares.

Figure 1:
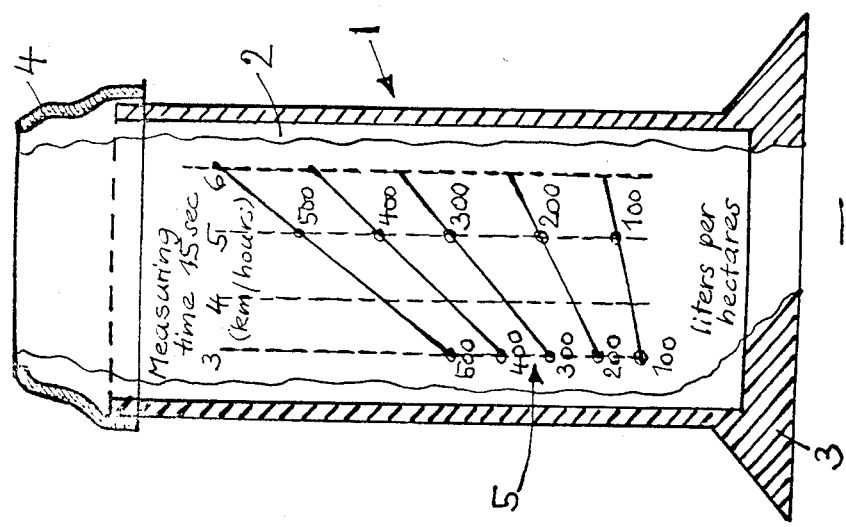
FIG. 1 is, partly in cross section, a side view of a measuring cylinder according to the invention.

With the embodiment according to FIG. 2, a spring balance 8 is mounted on a stationary support 7, f.i. provided on a support plate 6. With its one end the spring balance 8 is provided with a hook 9 including an indicating element 10, f.i. a horizontal pointer; a measuring container 11, f.i. a measuring bag, which contains the amount of liquid discharged for measuring and checking purposes, is suspended from hook 9. On plate 6 a scale 12 (calibrated similar to scale 5 according to FIG. 1, however, the marking being turned upsidedown in view of scale 5 of FIG. 1 so that the uppermost markings are equivalent to the minimum volume of liquid within bag 11) is provided, which can be made as a diagram. According to the weight of the amount of liquid suspended from the spring balance, the indicating element 10 marks the value "liters per hectares" on the scale and the amount of liquid discharged from the spraying machine.

I claim:

1. A device for determining an amount of fluid substance in terms of volume per area to be discharged from a spraying machine movable at different speeds based on an actual amount of fluid substance discharged from said spraying machine during a predetermined time period, said device comprising:

a container having a top and a side for collecting fluid substance discharged from said spraying machine, at least one scale calibrated for said predetermined time period in association with said container, each said scale comprising markings which signify units of volume of fluid substance per area related to additional markings which designate a predetermined speed of movement of said machine, said markings and said additional marking providing means for calculating the volume amount of fluid substance to be discharged per unit area at each said predetermined speed based on the volume amount of fluid substance discharged from said machine which is collected in said container during said predetermined time period.

2. A device in accordance with claim 1, wherein said container is a calibrated measuring cylinder.

3. A device in accordance with claim 1, wherein said markings are provided in gradations on said container.

4. A device in accordance with claim 1, wherein said markings are provided as diagrams on said container.

5. A device in accordance with claim 1, wherein said at least one scale is machined into said side of the container.

6. A device in accordance with claim 1, wherein said at least one scale is applied onto said side of the container.

7. A device in accordance with claim 1, wherein said container further comprises a flexible collar positioned at the top of said container.

8. A device in accordance with claim 1, wherein said container is a bag.

9. Method for determining the actual amount of discharge of a fluid substance in terms of volume per area from a spraying machine, having at least one nozzle and being movable at different speeds, based on an amount of fluid substance discharged from said spraying machine during a predetermined time period comprising the following steps:

(a) collecting said fluid substance discharged from one said nozzle during a predetermined time period in a container having at least one scale calibrated for said predetermined time period in association with said container, each said scale comprising markings which signify units of volume of substance per area related to additional markings which designate a predetermined speed of movement of said machine, (b) comparing the height of said fluid substance collected in said container with said markings on said scale to calculate the volume amount of fluid substance which will be discharged from said nozzle per unit area for said predetermined speed of movement of said machine, and (c) reading the calculated volume amount of fluid substance to be discharged from said scale and comparing it with the required volume amount of fluid substance to be discharged from said spraying machine whereby a difference between said calculated volume amount of fluid substance to be discharged and said required amount of fluid substance to be discharged indicates that an adjustment of said nozzle is in order.

10. A device for determining an amount of fluid substance in terms of volume per area to be discharged from a spraying machine movable at different speeds based on an actual amount of fluid substance discharged from said spraying machine during a predetermined time period, said device comprising:

a container having a top and a side for collecting fluid substance discharged from said spraying machine, a spring balance in communication with said container, said spring balance being associated with at least one scale calibrated for said predetermined time period, each said scale comprising markings which signify units of volume of fluid substance per area related to additional markings which designate a predetermined speed of movement of said machine, said markings and said additional markings providing means for calculating the volume amount of fluid substance to be discharged per unit area at each said predetermined speed based on the volume amount of fluid substance discharged from said machine which is collected in said container during said predetermined time period.

11. A device in accordance with claim 10, wherein said container is a bag.

* * * * *

UNITED STATES PATENT AND TRADEMARK OFFICE
CERTIFICATE OF CORRECTION

PATENT NO. : 4,491,023
DATED : January 1, 1985
INVENTOR(S) : Steffen GRAEF

It is certified that error appears in the above-identified patent and that said Letters Patent is hereby corrected as shown below:

Column 1, line 21/22, add ---of--- before "different".

Column 1, line 55, add ---parameter--- after "pressure".

Column 2, line 35, change "predetermined" to ---determined---.

Column 2, line 54, change "other" to ---one--- before "and".

Signed and Sealed this

Sixteenth Day of July 1985

[SEAL]

Attest:

DONALD J. QUIGG

Attesting Officer        Acting Commissioner of Patents and Trademarks